(12) United States Patent
Smith (10) Patent No.: US 7,210,034 B2
(45) Date of Patent: Apr. 24, 2007

(54) DISTRIBUTED CONTROL OF INTEGRITY MEASUREMENT USING A TRUSTED FIXED TOKEN

(75) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 845 days.

(21) Appl. No.: 10/355,977

(22) Filed: Jan. 30, 2003

(65) Prior Publication Data

US 2004/0153646 A1    Aug. 5, 2004

(51) Int. Cl.
*H04L 9/32* (2006.01)
*G06F 12/14* (2006.01)

(52) U.S. Cl. .......................... 713/155; 726/21
(58) Field of Classification Search ................ 713/152, 713/179, 192; 726/9, 16
See application file for complete search history.

(56) References Cited

U.S. PATENT DOCUMENTS

| | | | | |
|---|---|---|---|---|
| 5,421,006 | A * | 5/1995 | Jablon et al. ................. 714/36 |
| 6,125,186 | A * | 9/2000 | Saito et al. ................. 380/287 |
| 6,138,236 | A * | 10/2000 | Mirov et al. ................. 726/26 |
| 6,185,678 | B1 * | 2/2001 | Arbaugh et al. ............... 713/2 |
| 6,330,670 | B1 * | 12/2001 | England et al. ............... 713/2 |
| 6,820,063 | B1 * | 11/2004 | England et al. .............. 705/54 |
| 6,938,157 | B2 * | 8/2005 | Kaplan ....................... 713/176 |
| 6,988,250 | B1 * | 1/2006 | Proudler et al. .............. 716/1 |
| 7,069,442 | B2 * | 6/2006 | Sutton et al. ............... 713/179 |
| 7,076,655 | B2 * | 7/2006 | Griffin et al. ............... 713/164 |
| 2003/0021417 | A1 * | 1/2003 | Vasic et al. ................. 380/277 |
| 2003/0037246 | A1 * | 2/2003 | Goodman et al. .......... 713/191 |
| 2003/0041250 | A1 * | 2/2003 | Proudler ..................... 713/182 |
| 2003/0097558 | A1 * | 5/2003 | England et al. ............. 713/155 |
| 2004/0003288 | A1 * | 1/2004 | Wiseman et al. ........... 713/201 |
| 2004/0039924 | A1 * | 2/2004 | Baldwin et al. ............ 713/189 |
| 2004/0039946 | A1 * | 2/2004 | Smith et al. ................. 713/202 |
| 2004/0060046 | A1 * | 3/2004 | Good et al. .................. 717/174 |
| 2004/0078581 | A1 * | 4/2004 | Dublish et al. ............. 713/189 |
| 2004/0117318 | A1 * | 6/2004 | Grawrock ..................... 705/66 |
| 2004/0117625 | A1 * | 6/2004 | Grawrock .................... 713/168 |

* cited by examiner

*Primary Examiner*—Gilberto Barron
*Assistant Examiner*—Thomas M Szymanski
(74) *Attorney, Agent, or Firm*—Michael R. Barre (57) ABSTRACT

A system for controlling integrity measurement of an un-trusted system component on a client system includes a trusted management utility configured to measure the integrity of the un-trusted system component, a trusted fixed token resident on the client system, and a trusted registration service. The trusted registration service creates a signed hash of the trusted management utility software and stores the signed hash of the trusted management utility software in the trusted fixed token. The trusted registration service creates a security domain and stores the security domain in the trusted fixed token. The trusted fixed token creates a signed hash of the trusted management utility software and the security domain, and securely communicates the signed hash of the trusted management utility software and the security domain to the trusted registration service. The trusted management utility software is installed on the client system and executed to gather integrity measurements on the un-trusted system component. A hash of the un-trusted system component and the trusted management utility software is created and stored in the trusted fixed token. This data may be combined with the security domain. The hash of the un-trusted system component, the trusted management utility software, and the security domain may be interrogated by the trusted registration service to verify the integrity of the un-trusted system component.

20 Claims, 4 Drawing Sheets

DISTRIBUTED CONTROL OF INTEGRITY MEASUREMENT USING A TRUSTED FIXED TOKEN

BACKGROUND

1. FIELD

The present invention relates generally to computer security and, more specifically, to establishing trust in a computer system by evaluating the integrity of components of the computer system.

2. DESCRIPTION

Personal computers (PCs) are typically designed to be open computing systems, and the Internet is designed as an open networking infrastructure. In supplier/buyer electronic commerce and electronic business applications, corporate intranets, and Web portals, this quality of openness has provided information technology (IT) organizations and PC users with the flexibility they need to communicate, collaborate, and conduct transactions. As a result, business-to-business (B2B), business-to-employee (B2E), and business-to-consumer (B2C) applications enable IT to reach a global base of customers and partners with tremendous economies of scale.

For IT managers, this quality of openness can be a two-edged sword, because it can render PCs vulnerable to malicious parties and hackers. Traditional PC security in business depends on a chain of trust, beginning with the IT manager who must trust the computer's operating system, the PC manufacturer, the users of the systems, and also trust that physical security is adequate. Computer security usually involves protecting data and systems from unauthorized access. Corporate IT departments must provide authenticated users with access to authorized information and keep unauthorized persons out.

Many computer users often operate under the assumption that the underlying hardware, firmware, and software of their computer systems have not been compromised. In many cases, these systems may be administered remotely by an IT organization or other owner of the systems. Often, the IT organization or other owner desires to evaluate the integrity of the computer systems. One challenge for remotely administered systems is establishing trust in some components, while allowing other components to remain un-trusted until proof of trustworthiness has been collected and evaluated.

BRIEF DESCRIPTION OF THE DRAWINGS

The features and advantages of the present invention will become apparent from the following detailed description of the present invention in which.

DETAILED DESCRIPTION

An embodiment of the present invention is a method and apparatus that allows integrity measurement of computer system components to occur even when the chain of trust from system boot to the current time is broken or incomplete. Embodiments of the present invention allow a remote entity to administer a uniform policy for integrity measurement and vulnerability assessment even when embedded measurement policies contradict organizational policy. Embodiments of the invention may be used by IT organizations seeking to find vulnerabilities in broadly diverse computing systems containing trusted fixed tokens (TFTs). Trust in a computer system may be built by obtaining integrity metrics of components of the computer system, securely storing these metrics in the computer system, and then ensuring that reporting of the metrics from the computer system to another entity is secure.

For example, before making content available to a remote user, it is likely that a content provider will want to know that a remote computer system is trustworthy. The provider's system (e.g., the challenger) queries the remote computer system (e.g., the challenged system). During system boot (or post-boot, using a trusted management utility (TMU), the challenged system creates a series of cryptographic digests (of the integrity metric results) that represent the software environment of the challenged system. These digests are statistically unique indications of the environment, yet they may occur in all systems having exactly the same environment. When the remote system receives the query from the challenger, the remote system responds by digitally signing and sending the integrity metric data to the challenger. The digital signature included in the digests deters tampering and allows the challenger to verify the integrity of the metric data. If the signature is verified, the challenger can then determine whether the identity metrics are trustworthy. If so, the challenger (e.g., the content provider) may then deliver the content. The challenged system reports the metrics and corresponding measured components to the challenger and lets the challenger make the final decision regarding the trustworthiness of the remote system. Based on the reported integrity metric data, the challenger can determine if the remote system is configured in a trusted state.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
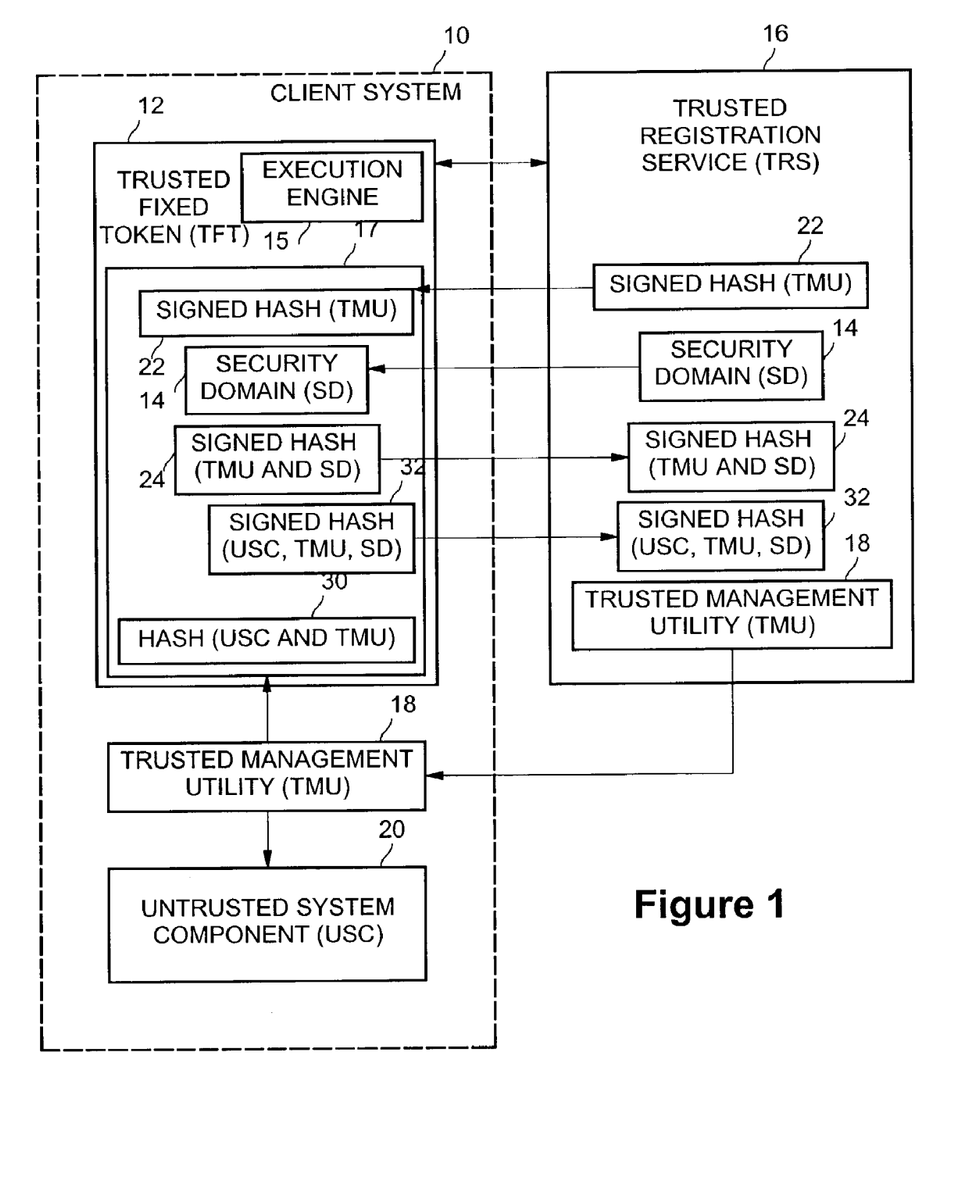
FIG. 1 is a block diagram of an integrity measurement architecture according to an embodiment of the present invention.

FIG. 1 is a block diagram of an integrity measurement architecture according to an embodiment of the present invention. A client system 10 may be any processing system operated by a user for any purpose, such as a desktop or mobile PC, a workstation, a personal digital assistant, an Internet tablet or Web pad, a cellular telephone, or other digital processing device. In at least one embodiment of the present invention, the client system may comprise a trusted fixed token (TFT) 12. The TFT comprises hardware included in the client system for securely storing data. The TFT provides a protected storage area 17 that may be very difficult to obtain unauthorized access to. In one embodiment, the TFT may be used to store system configuration registers and information describing a particular client system of which the TFT is a part. In particular, a TFT may be used to store integrity metric data for the client system. In one embodiment, the TFT also includes an execution engine 15 for processing data. In this embodiment, execution engine 15 within the TFT may comprise a special purpose processor and/or circuitry to perform cryptographic processing, including at least one of hardware protected key generation, random number generation, and hash and digital signature processing. In one embodiment, the TFT works with and enhances existing public key infrastructure (PKI) capabilities wherein private keys are generated, stored, and used only in the protected storage of the TFT.

Systems containing a fixed token can leverage trust placed in the design and implementation of the token to create a security domain (SD) 14 with which a trusted management node such as trusted registration service (TRS) 16 may interact. In one embodiment, the TRS may be operated on a server communicatively coupled over a computer network with the client system. In some cases, the TRS and the server may be operated by an IT organization and the TRS and the client system may be communicate via a local area network (LAN), a wide area network (WAN), or a metropolitan area network (MAN). In other cases, the TRS may be operated by a content or service provider and the TRS and the client system may communicate via the Internet.

In order to gather integrity measurements, the TRS may install a trusted management utility (TMU) 18 into the client system. The TMU bootstraps trust in an operating environment comprising discrete measurable components such as one or more un-trusted security components (USCs) 20. The TMU comprises software to obtain an accurate report or measurement of the state of the underlying computing system (e.g., the client system) by examining one or more system components. The TMU may contain code and policy information that dictates integrity measurement actions to be applied to USCs on a remote computing system containing a TFT. A USC may comprise any software or firmware component resident on the client system wherein the trustworthiness of the component is undetermined.

In one embodiment, the TMU may be installed from the TRS into the client system, loaded into random access memory (RAM), executed by a processor, and then deleted from the client system. The TMU may run platform integrity metrics to determine the current state of a client system. In one embodiment, the TMU may measure the integrity of one or more of the client system's basic input output system (BIOS), master boot record, operating system (OS) loader, executable files and libraries of a host OS, virtual memory (VM) or BIOS flash process, and other system configuration information, and create one or more cryptographic digests that represent the software environment of the client system. In other embodiments, other measurements of the client system's software, firmware, and hardware may be obtained by the TMU. In one embodiment, use of the TMU may be integrated with the IT organization's asset management process.

The TRS may be trusted by virtue of it having been previously evaluated and controlled by its owner (e.g., the corporate IT organization) using any known means. Additionally, since the TMU originates from the TRS environment, the TMU is also trusted at the time of installation on the client system.

A bootstrap phase prepares the un-trusted client system for later evaluation that may result in the TRS concluding that certain USCs may be trusted. In some instances, client systems cannot prove an unbroken chain of trust exists from system boot to the current time and current system configuration. The chain of trust can be broken by non-participatory components such as an OS, VM, or application modules that do not implement a trust semantic or whose implementation lacks the security coverage desired by the TRS owner. Embodiments of the present invention overcome the broken chain of trust situation to determine if a client system may be trusted.

Figure 2:
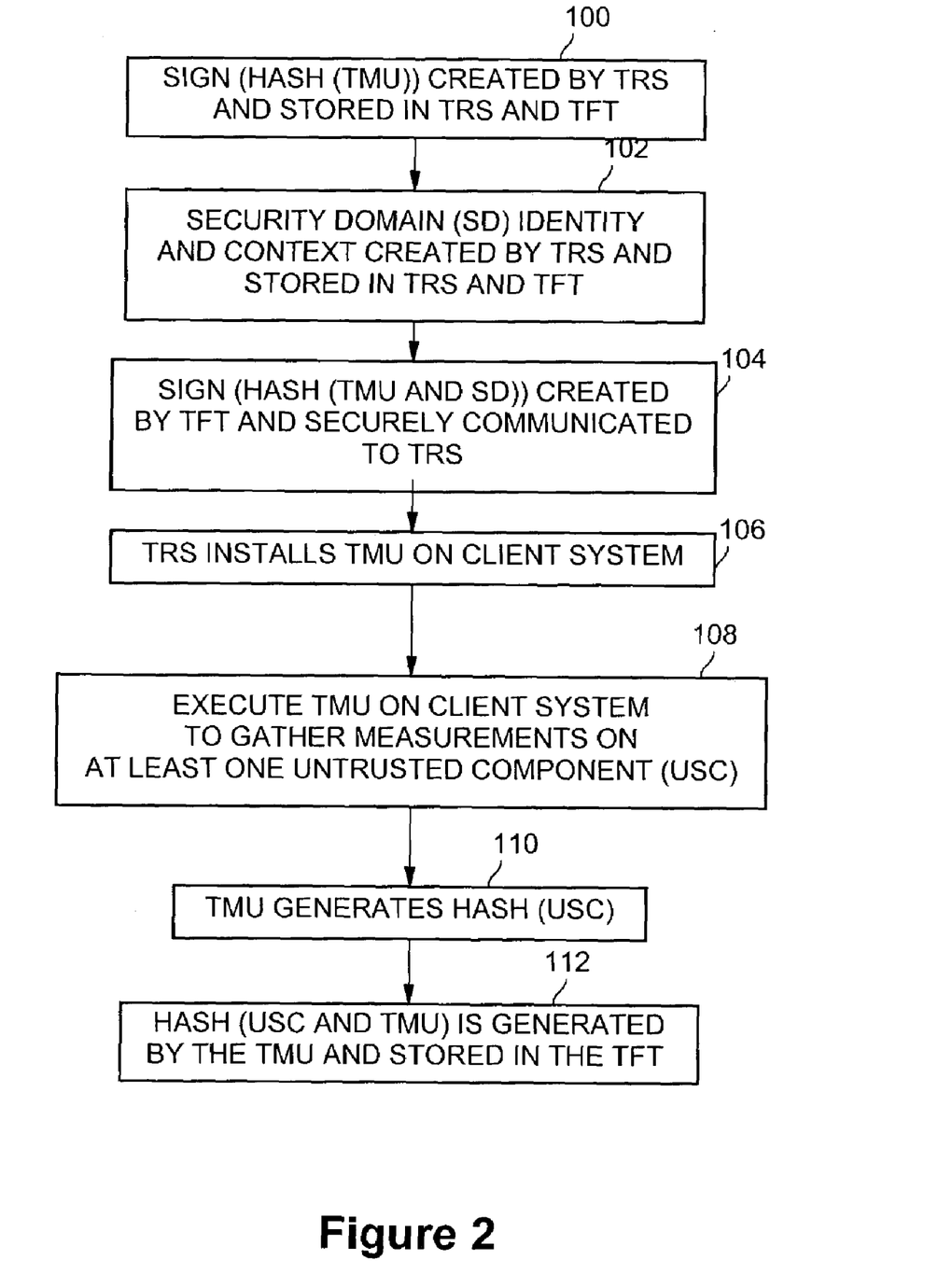
FIG. 2 is a flow diagram illustrating control of integrity measurement according to an embodiment of the present invention.

FIG. 2 is a flow diagram illustrating integrity measurement according to an embodiment of the present invention. For the TMU to be useful to bootstrap trust in the client system, information about the TMU may be stored in the TRS prior to downloading the TMU to the client system. At block 100, a cryptographic hash of the TMU code may be determined by the TRS and stored in a message data structure. A nonce (e.g., a random number) may be generated by the TRS to correlate subsequent reports from the TMU. The message data structure may also contain a text label that disambiguates the intentions of the signer. The hash may be digitally signed and stored in the TRS as the signed hash 22 of TMU for later use in integrity verification processing, as well as stored in the TFT of the client system. For example, in one embodiment the message data structure storing signed hash 22 may be generated as: MSG1(label1, nonce1, SIGN(HASH(TMU, label1, nonce1))) with a TRS signing key (K1). Storage of the signed hash 22 is done by the asset owner in a protected environment. Subsequent attempts to write to the storage location will require a pass phrase known to the owner. In one embodiment, the storing of the signed hash 22 of the TMU code into the TFT 12 may be performed by an IT organization when the client system is first put into service in a corporate IT environment. In one embodiment, the hash may be determined by using the well-known SHA-1 algorithm. In one embodiment, the signed hash of the TMU code may be of relatively small size (e.g., approximately 20–50 bytes) and easily stored in the TFT.

At block 102, the signed hash of the TMU (e.g., MSG2 (label2, nonce2, SD domain ID, SIGN(HASH(label2, nonce2, TMU, SD domain ID))) with K1 or delegate key of K1) may be included in the creation of a security domain (SD) 14 identity and context that may be stored inside the TFT 12. The TRS creates a context that includes cryptographic keys that may be used to communicate securely between the TFT and the TRS. The SD may include one or more public/private key pairs and zero or more unique identifiers issued by the TRS. In one embodiment, a TRS signing key may be generated by the TRS and included as part of the context. The TFT participates in the creation of the SD by generating an asymmetric key pair; the private portion remaining in the TFT, and the public portion shared with the TRS. The TRS provides the domain identity (i.e., namespace). The keys and namespace are an embodiment of the context. In one embodiment, a unique identifier may comprise a uniform resource locator (URL) or uniform resource identifier (URI). In another embodiment, the unique identifier may be the nonce generated as part of block 100. In another embodiment, the unique identifier may be the public key portion of the TRS signing key. The SD 14 may be communicated from the TRS to the TFT. The SD may be trusted on the client system because the SD is physically protected by the TFT. The SD context, including the signed TMU hash 22, is a measurable component on the client system and may be measured as part of SD creation. In various embodiments of the invention, there may be multiple SDs per client system. Any one of several well-known protocols for SD creation may be used as long as the steps and constraints outlined herein are followed.

Once the SD has been created in the client system's TFT 12, a hash of the TMU and the SD 24 may be created and signed by execution engine 15 of the TFT and securely communicated from the TFT to the TRS at block 104 (e.g., MSG3(label3, nonce3, SIGN(HASH(label3, nonce3, nonce2, nonce1, TMU, SD)with TFT key K2). The TMU and SD message digests received from the TFT may be used by the TRS 16 to verify that the TMU hash values determined at block 100 are still the same as those supplied by the client system at block 104. Further evaluation of the SD creation process by the TRS may assist in establishing trust in the TFT, including SD creation, which does not require the TRS to trust any other components besides the TFT.

Next, at block 106 the Trusted Registration Service (TRS) installs the Trusted Management Utility (TMU) 18 into an un-trusted environment on the client system 10. The un-trusted client system can reasonably allow the TMU to execute because the TMU is independently verifiable as being associated with the SD on the client system's TFT. In one embodiment, the TMU may be encrypted prior to communication to the client system, and decrypted on receipt by the client system, to deter unauthorized access to the TMU during transfer from the TRS to the client system. The TMU may be stored on at least one of the client system's hard drive and main memory. In one embodiment, the TMU may be downloaded to the client system for each use, executed, and then deleted so that the TMU is not resident on the client system's hard drive.

The TMU may be executed on the client system at block 108 to gather integrity measurements on at least one USC of the client system. In one embodiment, the measurement comprises a cryptographic hash of the USC code as shown at block 110. At block 112, the TMU generates a hash of the TMU's code and the USC hash 30, thus binding the TMU to the USC measurement. This action records the state of the TMU during measurement of the USC. In one embodiment, a copy of the measured component (e.g., the USC) may be collected in full or in part into a log file (or directly) transmitted to the TRS. The TRS may already have baseline measurements for the measured component collected from other sources. If so, the TMU may not create a log and/or transmit the baseline. The baseline may be encrypted on the client system's disk or when communicated over a transmission line. In one embodiment, the hash of the TMU may be appended to the hash of the USC (e.g., HASH(nonce4, TMU, USC)). In one embodiment, MSG4(nonce4, TMU, USC) or MSG4(nonce4, HASH(TMU, USC)) may be stored in a log file or transmitted to TRS as baseline result. Nonce4 prevents earlier executions of this step from being replayed to the TFT. The intermediate result (e.g., combined hash of USC and TMU 30) may be forwarded by the TMU to be stored in the TFT.

The TMU is vulnerable to attack while it is executing. However, the TMU may take precautions against rogue software by ensuring the safest possible execution environment exists by binding an image of itself to the TFT, including the current client system configuration, and extending the system configuration between unbind and bind operations. This may be done at several points during TMU execution to detect either modification to the TMU or a change in the operating state of the client system. In one embodiment, at random intervals during measurement of a USC component, the TMU measures the non-relocated memory image of itself and appends that result to the current USC measured value. The memory image and USC image offset values may be written to a log file or transmitted back to the TRS. The measurement result may be stored in the TFT (as per block 112). A final iteration may include binding the USC measurement to the SD. In various embodiments, execution of the TMU may be performed at periodic intervals or when certain events occur (for example, when a client system is connected to a specified network).

Figure 3:
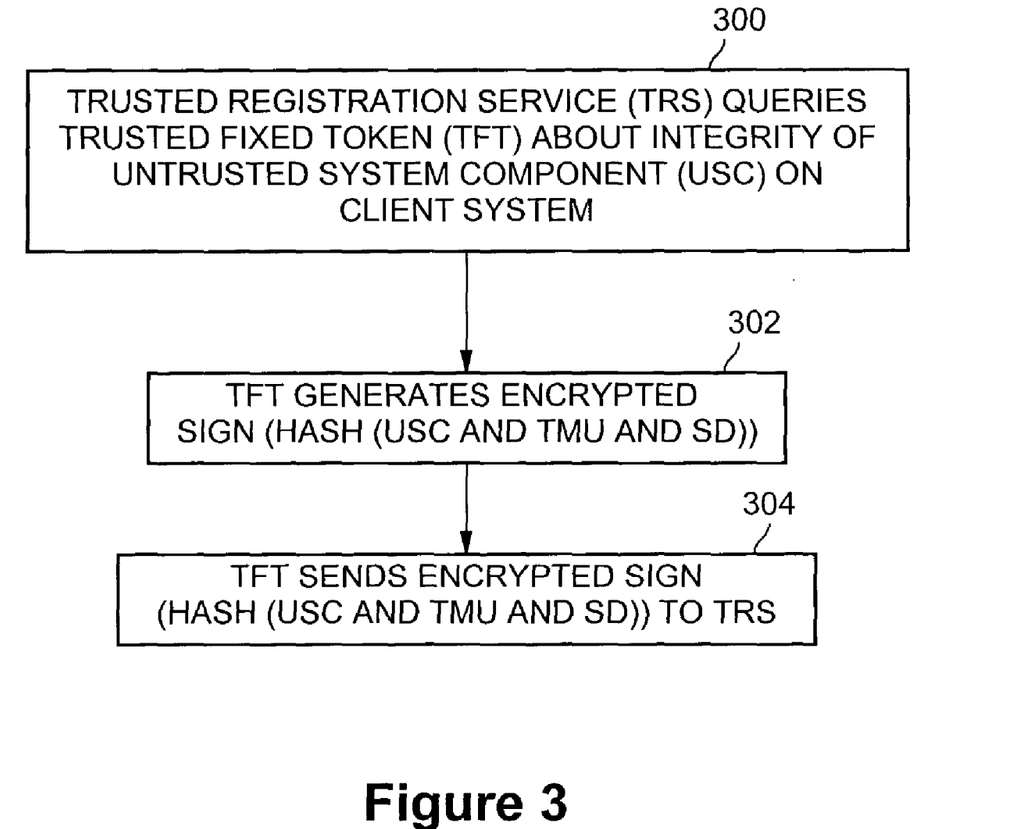
FIG. 3 is a flow diagram illustrating integrity reporting according to an embodiment of the present invention.

The TRS may construct a proof using contents of the SD and other reported information (e.g., client system configuration registers and manufacturing information) to evaluate the trustworthiness of the bootstrapped USC. FIG. 3 is a flow diagram illustrating integrity reporting according to an embodiment of the present invention. Reporting may be done dynamically based on an organizational policy. In one embodiment, reporting may be performed at the real-time request of an IT administrator. In another embodiment, reporting may be done on a scheduled periodic basis. The TRS initiates the reporting sequence by querying the TFT at block 300. In response, the execution engine 15 of the TFT 12 uses the collected measurements for the SD, TMU, and USC to generate a signed hash 32 of the USC, the TMU, and the SD using a signing key (part of the SD created at block 102) at block 302 (e.g., MSG5(label5, nonce5, SIGN(HASH (label5, nonce5, nonce4, nonce3, nonce2, nonce1, USC, TMU, SD))with K2).

Digital signing may be used to protect the integrity of the data during communication from the TFT to the TRS. In one embodiment, the signed hash may be encrypted using an encryption key (also part of the SD). The TFT sends the encrypted, signed hash of the USC, the TMU, and the SD to the TRS for evaluation at block 304. The client system may send a log of USC components to the TRS for which a baseline metric does not exist at the TRS. The TRS may request the log from the client system during evaluation (as described below with reference to FIG. 4) as needed. The integrity of the log is protected by the content of block 304.

Next, the TRS evaluates the trust in the USC. One aspect of the evaluation is to tie reported measurement values to previously known values. Because the TMU originated from the TRS, the hash of the TMU is known. Reported values for the TMU may be returned twice, once during SD creation and registration, and again when USC measurements are stored. During SD creation, the TFT signed and encrypted the TMU measured values along with the SD measured value. Only the TRS in the present invention is able to decrypt and verify these values. Trust in the SD is based on the belief that the TFT has not been compromised. In both cases, the TMU is bound to measurements whose trust has not been established, thereby allowing trust in the TMU to be leveraged. If the measured TMU values remain unchanged, then the TRS can conclude that the TMU associated with the SD is trusted to measure the USC. Measurement of the USC results in the TMU measuring itself, thereby binding the TMU to the USC measurement.

Figure 4:
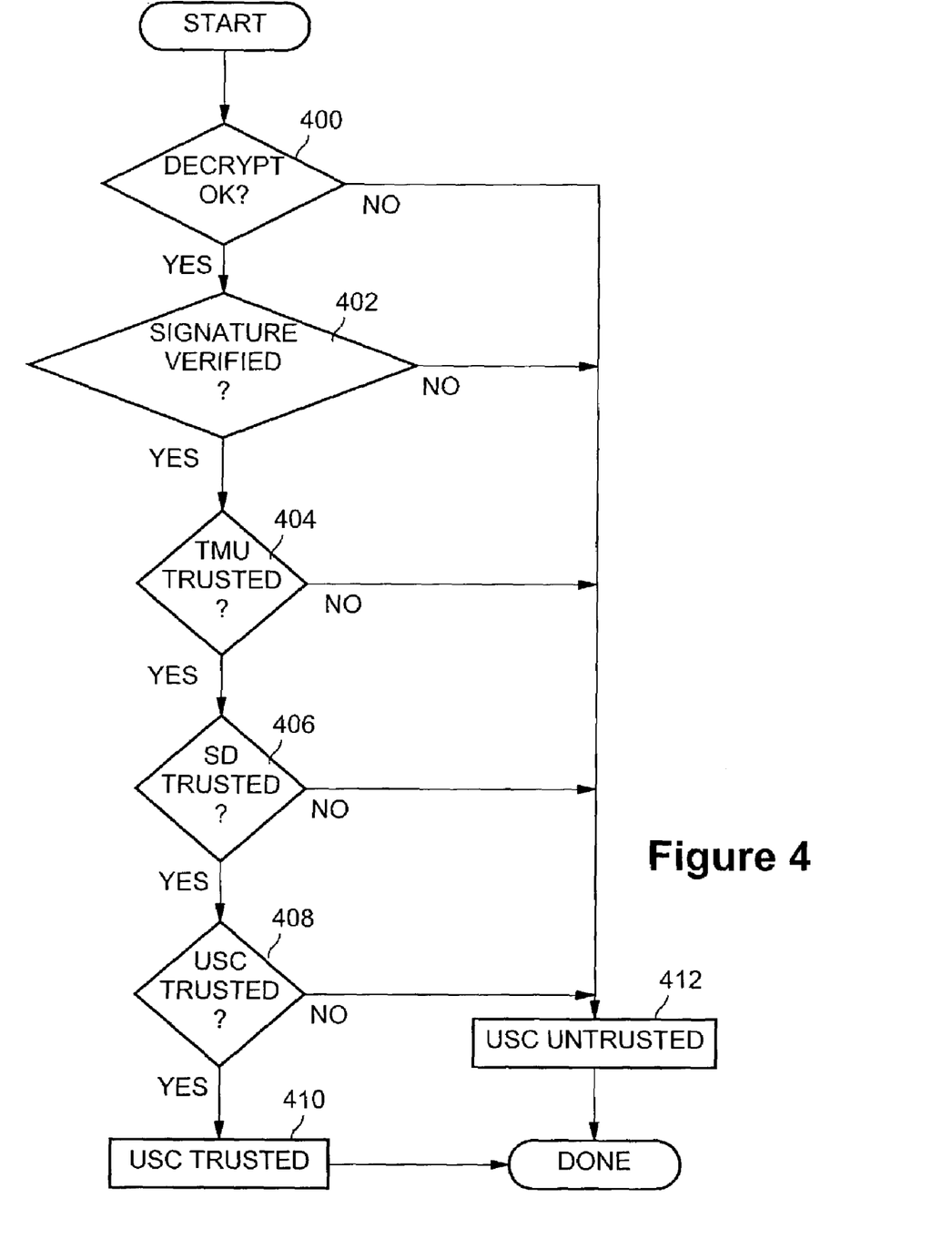
FIG. 4 is a flow diagram illustrating integrity evaluation according to an embodiment or the present invention.

FIG. 4 is a flow diagram illustrating integrity evaluation according to an embodiment or the present invention. At block 400, the TRS attempts to decrypt the data sent by the TFT in response to the query by the TRS. If the decrypt is acceptable, processing continues at block 402. If not, the USC may be determined to be un-trusted. At block 402, the TRS attempts to verify the digital signature of the data sent by the TFT. If the signature is verified, processing continues with block 404. If not, the USC may be determined to be un-trusted at block 412. At block 404, the TRS compares the hash 22 of the TMU previously stored in the TRS to the hash of the TMU 32 received from the TFT. If the hashes match, the TMU is trusted and processing continues at block 406. If not, the USC may be considered to be un-trusted at block 412. At block 406, the TRS compares the hash 24 of the SD previously stored in the TRS to the hash 32 of the SD received from the TFT. If the hashes match, the SD is trusted and processing continues at block 408. If not, the USC may be considered to be un-trusted at block 412. At block 408, the TRS compares a baseline or expected measurement result with the reported result from block 304. The TRS may recompute the expected result from the log of USC components (not shown)(to determine if the USC is trusted. If all of the encryption, signatures, TMU, SD and expected values for measured USC components, are verified, then the USC may be considered to be trusted at block 410.

Embodiments of the present invention define a new approach to measuring the integrity of system components of a remote client system. Current approaches do not rely on a TFT for TMU protection during registration, installation, execution and/or reporting stages involving the TMU. Still other approaches require an OS, VM or BIOS to perform TMU functions. The present invention allows existing configuration reporting via the TFT to be extended to non-participating system components. In systems where a participating system component (e.g., an OS, VM, etc.) provides protected execution, the TMU may be used to further extend the reach of measured components. In either case, the TMU employs anti-tampering strategies involving the TFT that further thwart possible attacks. In the present invention, the root of trust originates on a remote server (e.g., the TRS) where additional physical and operational security procedures may be in place to protect both TMU embedded measurement rules, verification procedures and integrity of baseline measurements. Security domain policies developed at the TRS can be tied to distributed security domain participants (e.g., client systems) having various levels of domain participation. By using embodiments of the present invention, an IT organization may also separate a client system monitoring policy from a trust enforcement policy.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multi-processor systems, minicomputers, mainframe computers, clients, servers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for controlling integrity measurement of an un-trusted system component on a client system comprising:
    a trusted management utility configured to measure the integrity of the un-trusted system component by generating a hash of the un-trusted system component;
    a trusted fixed token resident on the client system; and
    a remote server coupled to the client system over a network, the remote server providing a trusted registration service configured to create a signed hash of the trusted management utility, store the signed hash of the trusted management utility in the trusted fixed token, create a security domain associated with the trusted management utility, store the security domain in the trusted fixed token, and dynamically install the trusted management utility on the client system based on an integrity measurement policy;
    wherein the trusted fixed token is configured to create a signed hash of the trusted management utility and the security domain, to securely communicate the signed hash of the trusted management utility and the security domain to the trusted registration service, to generate a signed hash of the un-trusted system component, the trusted management utility, and the security domain, and to send the signed hash of the un-trusted system component, the trusted management utility, and the security domain to the trusted registration service: and
    wherein the trusted management utility is deleted from the client system after measuring the integrity of the un-trusted software component.

2. The system of claim 1, wherein the trusted fixed token comprises an execution engine to create the signed hash of the trusted management utility and the security domain, and a protected storage area to securely store client system data.

3. The system of claim 2, wherein the trusted management utility is further configured to generate a hash of the un-trusted system component, and a hash of the trusted management utility and the un-trusted system component's hash.

4. The system of claim 3, wherein the trusted fixed token is further configured to store the hash of the trusted management utility and the un-trusted system component's hash in the protected storage area.

5. The system of claim 4, wherein the trusted registration service is further configured to verify the signed hash of the un-trusted system component, the trusted management utility, and the security domain.

6. The system of claim 1, wherein the trusted management utility is configured to measure the integrity of at least one of a basic input output system (BIOS), a master boot record, and an operating system loader of the client system.

7. The system of claim 1, wherein the security domain comprises at least one cryptographic key pair and a unique identifier.

8. A method of controlling integrity measurement of an un-trusted system component on a client system comprising:
  creating, by a trusted registration service, a signed hash of trusted management utility software and storing the signed hash of the trusted management utility software in a trusted fixed token on the client system;
  creating, by a trusted registration service operating on a remote server coupled to the client system over a network, a security domain associated with the trusted management utility software and storing the security domain in the trusted fixed token;
  creating, by the trusted fixed token, a signed hash of the trusted management utility software and the security domain, and securely communicating the signed hash of the trusted management utility software and the security domain to the trusted registration service;
  dynamically installing the trusted management utility software on the client system based on an integrity measurement policy;
  executing the trusted management utility software on the client system to gather measurements on the un-trusted system component by generating a hash of the un-trusted system component; and
  creating a hash of the un-trusted system component and the trusted management utility software, and storing the hash of the un-trusted system component and the trusted management utility software in the trusted fixed token; and
  deleting the trusted management utility from the client system.

9. The method of claim 8, further comprising:
  querying, by the trusted registration service, of the trusted fixed token on the client system about the integrity of the un-trusted system component;
  generating, by the trusted fixed token, a signed hash of the un-trusted system component, the trusted management utility software, and the security domain; and
  sending, by the trusted fixed token, the signed hash of the un-trusted system component, the trusted management utility software, and the security domain to the trusted registration service.

10. The method of claim 9, further comprising:
  verifying a signature of the signed hash of the un-trusted system component, the trusted management utility software, and the security domain received from the trusted fixed token;
  verifying the hash of the trusted management utility software;
  verifying the hash of the security domain; and
  trusting the un-trusted system component on the client system when the signature of the signed hash of the un-trusted system component, the trusted management utility software, and the security domain, the hash of the trusted management utility software, and the hash of the security domain are verified.

11. The method of claim 10, further comprising encrypting the signed hash of the un-trusted system component, trusted management utility software, and security domain by the trusted fixed token prior to sending the signed hash to the trusted registration service, and decrypting the signed hash of the un-trusted system component, trusted management utility software, and security domain by the trusted registration service on receipt.

12. The method of claim 8, wherein the security domain comprises cryptographic keys used to securely communicate with the trusted registration service.

13. An article comprising: a storage medium having a plurality of machine accessible instructions, wherein when the instructions are executed by a processor, the instructions provide for controlling integrity measurement of an un-trusted system component on a client system by
  creating, by a trusted registration service, a signed hash of trusted management utility software and storing the signed hash of the trusted management utility software in a trusted fixed token on the client system;
  creating, by the trusted registration service operating on a remote server coupled to the client system over a network, a security domain associated with the trusted management utility software and storing the security domain in the trusted fixed token;
  creating, by the trusted fixed token, a signed hash of the trusted management utility software and the security domain, and securely communicating the signed hash of the trusted management utility software and the security domain to the trusted registration service;
  dynamically installing the trusted management utility software on the client system based on an integrity measurement policy;
  executing the trusted management utility software on the client system to gather measurements on the un-trusted system component to generate a hash of the un-trusted system component;
  creating a hash of the un-trusted system component and the trusted management utility software, and storing the hash of the un-trusted system component and the trusted management utility software in the trusted fixed token; and
  deleting the trusted management utility from the client system.

14. The article of claim 13, further comprising instructions for:
  querying, by the trusted registration service, of the trusted fixed token on the client system about the integrity of the un-trusted system component;
  generating, by the trusted fixed token, a signed hash of the un-trusted system component, the trusted management utility software, and the security domain; and
  sending, by the trusted fixed token, the signed hash of the un-trusted system component, the trusted management utility software, and the security domain to the trusted registration service.

15. The article of claim 14, further comprising instructions for:
  verifying a signature of the signed hash of the un-trusted system component, the trusted management utility software, and the security domain received from the trusted fixed token;
  verifying the hash of the trusted management utility software;

verifying the hash of the security domain; and trusting the un-trusted system component on the client system when the signature of the signed hash of the un-trusted system component, the trusted management utility software, and the security domain, the hash of the trusted management utility software, and the hash of the security domain are verified.

16. The article of claim 15, further comprising instructions for encrypting the signed hash of the un-trusted system component, trusted management utility software, and security domain by the trusted fixed token prior to sending the signed hash to the trusted registration service, and decrypting the signed hash of the un-trusted system component, trusted management utility software, and security domain by the trusted registration service on receipt.

17. The article of claim 13, wherein the security domain comprises cryptographic keys used to securely communicate with the trusted registration service.

18. The system of claim 1, wherein the trusted registration service on the remote server stores the signed hash of the trusted management utility in the trusted fixed token when the client system is first put into service for a user.

19. The method of claim 8 further comprising wherein storing the signed hash of the trusted management utility in the trusted fixed token by the trusted registration service on the remote server when the client system is first put into server for a user.

20. The article of claim 13, comprising instructions to store the signed hash of the trusted management utility in the trusted fixed token by the trusted registration service on the remote server when the client system is first put into service for a user.

* * * * *